United States Patent [19]

Morozumi

[11] Patent Number: 4,604,617
[45] Date of Patent: Aug. 5, 1986

[54] DRIVING SYSTEM FOR A MATRIX DISPLAY PANEL

[75] Inventor: Shinji Morozumi, Suwa, Japan

[73] Assignee: Seiko Epson Corporation, Tokyo, Japan

[21] Appl. No.: 524,621

[22] Filed: Aug. 19, 1983

[30] Foreign Application Priority Data

Aug. 23, 1982 [JP] Japan .................. 57-145942
Oct. 28, 1982 [JP] Japan .................. 57-189618

[51] Int. Cl.[4] .............................................. G09G 3/00
[52] U.S. Cl. .................................. 340/805; 340/784; 358/160
[58] Field of Search ............. 340/784, 802, 805, 814; 358/160, 169

[56] References Cited

U.S. PATENT DOCUMENTS

| | | | |
|---|---|---|---|
| 3,976,362 | 8/1976 | Kawakami | 340/805 X |
| 4,156,254 | 5/1979 | Marino | 340/814 X |
| 4,257,045 | 3/1981 | Miles | 340/784 |
| 4,306,249 | 12/1981 | Croll | 358/160 X |
| 4,385,294 | 5/1983 | Miles | 340/784 X |
| 4,404,555 | 9/1983 | Long et al. | 340/784 |
| 4,462,027 | 7/1984 | Lloyd | 340/784 |
| 4,477,805 | 10/1984 | Arton et al. | 340/784 |
| 4,511,926 | 4/1985 | Crossland et al. | 340/784 X |

OTHER PUBLICATIONS

Article entitled, *A Pocket-Size Liquid Crystal TV Display*, written by E. Kaneko, et al., found in SID, vol. 23/1, 1982, pp. 3-8.

*Primary Examiner*—Gerald L. Brigance
*Assistant Examiner*—Vincent P. Kovalick
*Attorney, Agent, or Firm*—Blum Kaplan Friedman Silberman & Beran

[57] ABSTRACT

A driving circuit for a matrix display panel synchronizes composite video signals to drive a plurality of data lines and a plurality of scanning lines arranged in a matrix. The driving circuit blocks the data of the composite video signal approximately during the vertical blanking interval of the video signal. Further, during periods when signals are not applied to the data lines, the voltage level is maintained substantially equal on both the scanning and data lines. The RMS potential on the display is thereby reduced and higher contrast is provided. In an alternative embodiment, lines of data are also omitted at regular intervals during the effective display period.

8 Claims, 9 Drawing Figures

DRIVING SYSTEM FOR A MATRIX DISPLAY PANEL

BACKGROUND OF THE INVENTION

This invention relates generally to a matrix display panel of the type using liquid crystal elements and more particularly to a driving circuit for a matrix display panel which improves picture quality by reducing the number of lines of data used in producing the image.

A matrix display panel, wherein driving electrodes are arranged in a matrix in both the X and Y directions, is used for displaying letters, graphs and images. For example, in a liquid crystal display panel there are n×m picture elements or pieces, which are arranged to form n data lines and m scanning lines. In a conventional method of the prior art, the liquid crystal display panel is driven with multiplexed signals, namely one scanning line is selected and then data signals, provided on n data lines, are written into the respective picture elements of the scanning line. The period for applying the corresponding data to one picture element becomes 1/m of the entire period for driving the matrix and this is generally called "duty" (duty cycle). Generally speaking, at least 100 scanning lines are required for displaying pictures or graphs. When displaying images which require contrast in the gray scale, video signals are applied to the picture elements, for example, by modulating the width of the driving pulse in accordance with the gray scale levels.

In the case of television signals, there are 525 scanning lines in one frame and each frame is divided into an odd numbered field and an even numbered field by interlacing 262.5 scanning lines in each field. Accordingly, when displaying an image on the liquid crystal matrix panel with such television signals, the panel must be driven in 1/2.62.5 duty if every scanning line is to be applied to the matrix. Even when reducing image resolution to half, the matrix display panel must be driven with 1/131.25 duty. However, there is a disadvantage in driving a liquid crystal display panel at such a high duty in that the image contrast is not satisfactory.

What is needed is a simplified liquid crystal matrix display panel suitable for showing images requiring a high number of lines, for example, television images, with good contrast and resolution.

SUMMARY OF THE INVENTION

Generally speaking, in accordance with the invention, a driving circuit for a matrix display panel synchronizes composite video signals with scanning signals to drive a plurality of data lines and a plurality of scanning lines arranged in a matrix. The driving circuit for a matrix display panel blocks the data of the composite video signal approximately during the vertical blanking interval of the video signal. Further, during the period when signals are not applied to the data lines, the voltage level is maintained substantially equal on both the scanning and data lines. The RMS potential on the display is thereby reduced and higher contrast is provided. In an alternative embodiment, lines of data are omitted at regular intervals during the effective display period, improving the image resolution.

Accordingly, it is an object of this invention to provide an improved driving circuit for a matrix display panel providing improved image contrast by reducing duty of the liquid crystal panel.

Another object of this invention is to provide an improved driving circuit for a matrix display panel wherein image contrast is improved by increasing the ratio of effective On to Off voltages applied to liquid crystal elements.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
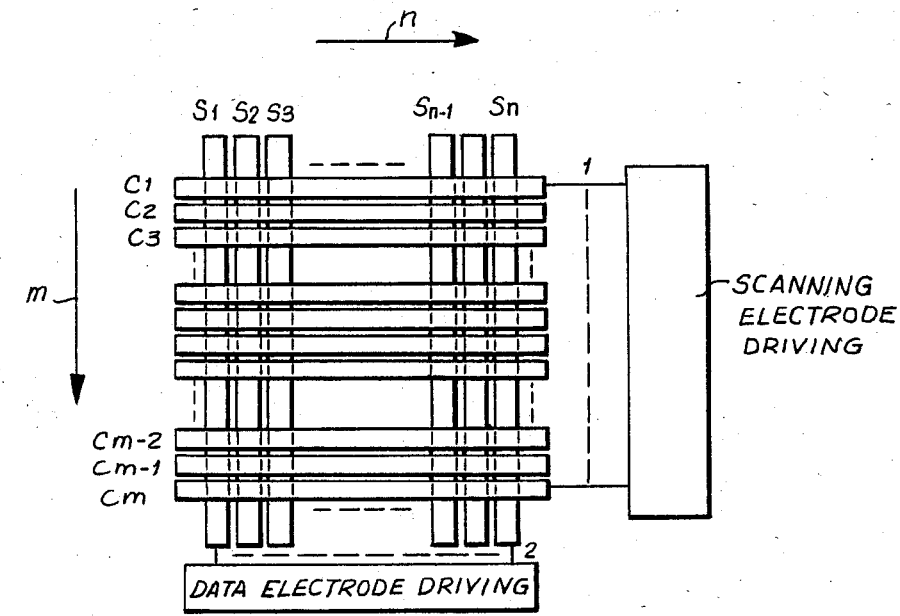
FIG. 1 illustrates the construction of a matrix liquid crystal display panel.

FIG. 1 illustrates an arrangement of picture element electrodes in a liquid crystal matrix panel. Data lines S1 to Sn extend in vertical columns and are parallel to each other in the row direction n. Scanning lines C1 to Cm extend in the horizontal or row direction and are numbered in the direction m of the columns. Thereby n×m picture elements are formed where the scanning and data lines overlap in the known manner.

Figure 2:
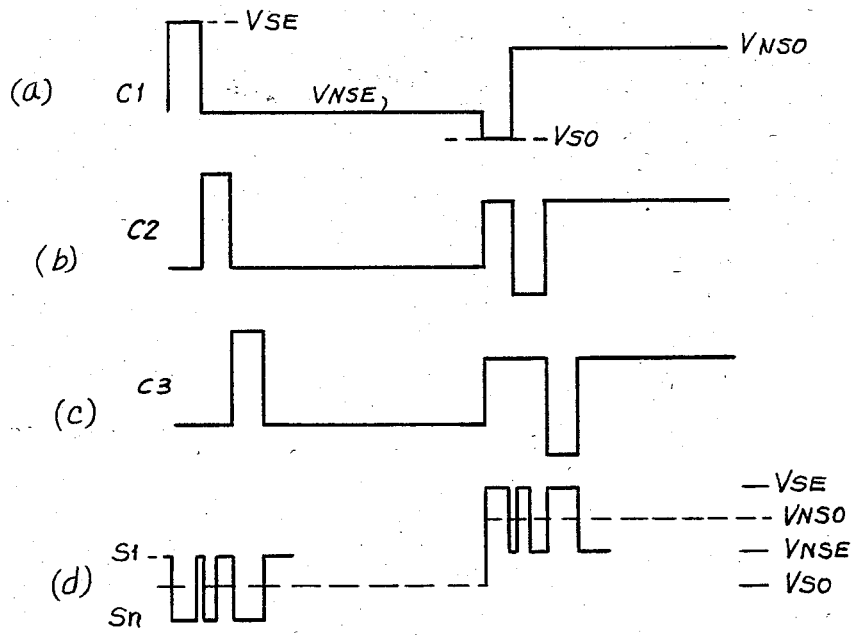
FIG. 2 illustrates waveforms of video signals and scanning signals for use with the matrix display panel of FIG. 1.

In FIG. 2, waveforms (a) to (d) are of one type of waveforms which are applied to n×m pieces of picture elements. As scanning signals C1, C2, C3 ... Cm are applied to the scanning lines C1, C2, C3 ... Cm respectively, the duty ratio is 1/m. Further, when displaying images require gray scale contrast, video signals S1 ... Sn can be provided by modulating the width of the driving pulses in accordance with the gray scale level as illustrated in the curve (d) of FIG. 2. Other techniques are also available to provide gray scale level.

For television signals, there are 525 scanning lines in one frame and each frame is divided into an odd numbered field and an even numbered field by interlacing 262.5 scanning lines in each field. When displacing an image on a liquid crystal matrix panel with such television signals, the panel must be driven with a 1/262.5 duty. Even if the resolution is reduced to half, this panel must be driven with a 1/131.25 duty. However, driving with such a high duty has disadvantage in that it is difficult for the liquid crystal panel to provide satisfactory image contrast.

Accordingly, it is an object of this invention to provide a driving circuit for a matrix display panel wherein image contrast is improved by equivalently decreasing the driving duty of the liquid crystal panel.

Another object of the invention is to provide an improved driving circuit for a matrix display panel wherein image contrast is improved by increasing the ratio of On to OFF effective voltage values applied to the liquid crystal elements. To increase this ratio, application of voltage to the liquid crystal is prohibited, that is, blocked, generally in the vertical blanking interval of the data signal.

Figure 3:
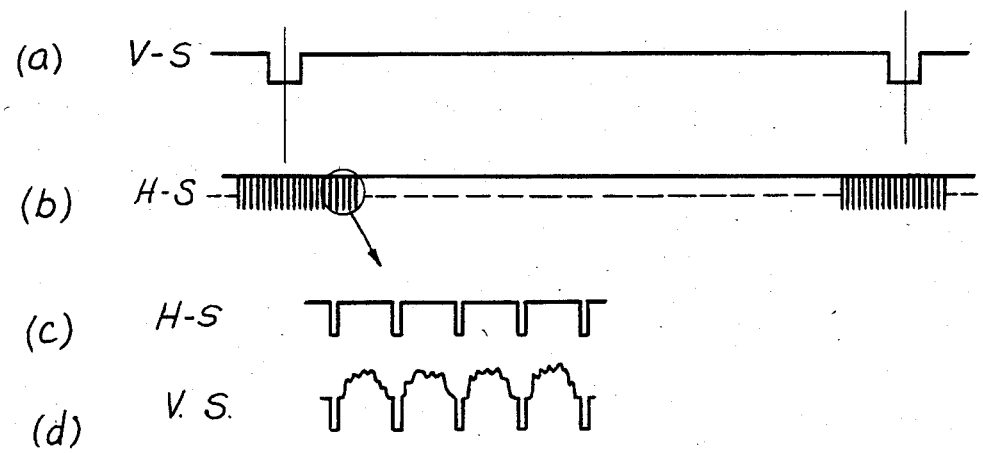
FIGS. 3 and 4 are timing charts of signals for the matrix display panel of FIG. 1.
Figure 4:
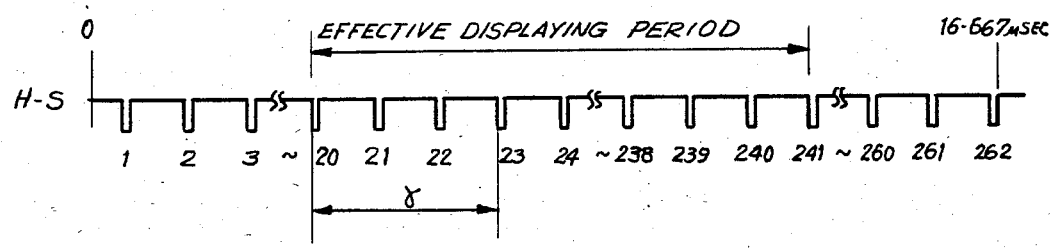

The following detailed description is based on a composite video signal of the National Television System Committee (NTSC system). FIG. 3 illustrates waveforms of an inputted video signal wherein curve (a) is the vertical synchronizing signal V-S, curve (b) is the horizontal synchronizing signal HS, curve (c) is an enlarged view of the horizontal synchronizing signal (b), and signal (d) is a video signal V.S. having picture element data between horizontal synchronizing pulses. In FIG. 4, the horizontal synchronizing signal (c) of FIG. 3, namely the horizontal scanning signal, is illustrated to an enlarged scale for easier comprehension.

One field of the signal is 1/60 seconds in duration, that is, 16.667 msec. In this one field are 262.5 lines of horizontal scanning signal. Thus, the number of lines in FIG. 3 (b) in one field, that is, between vertical synchronizing signals (a), is 262.5. The lines of FIG. 3 are in actuality square pulses as illustrated in FIG. 4 to an enlarged scale. In a liquid crystal matrix panel, use of half of the signals, that is, 131 lines of picture element signals is sufficient to provide a recognizable video display image. For example, when thinning out the scanning signal so that data for only every other line is used, the driving duty becomes 1/131 duty.

However, in actuality, only 200 to 220 of the 262.5 horizontal scanning signals contain almost all of the video information. On the other hand, the remaining 40-60 horizontal scanning signals within the vertical blanking interval, do not include any video information. Therefore, for instance, when the video signals during the 20th to 240th line portion of FIG. 4 are inputted to the liquid crystal panels and the input of video signals in the first to the nineteenth lines and the 241st to 262nd line portions of the signal are prohibited or blocked, the video signals included in the remaining 220 lines of scanning signals can be provided to drive the matrix panel. Accordingly, if the liquid crystal panel displays one image using only one of every two scanning signals and other scanning signals are blocked as described above, then 110 lines of scanning signals are provided to drive the liquid crystal matrix panel. This can provide satisfactory images.

Further, the RMS voltage value across the liquid crystal matrix panel during the vertical blanking interval, hereinafter called the inhibiting interval, is brought to a zero value by maintaining the potential of the scanning signal at a level equal to that of the video signal. This results in an increase in the ratio of RMS voltage values effectively applied to the liquid crystal and thereby the display contrast is improved.

Generally, in an AC amplitude selective multiplexing method of the V-NV type, if the duty is denoted by 1/D, the ratio of RMS voltages when the liquid crystal is on and when the liquid crystal is not on, that is, lit and non-lit, is expressed as follows:

$$\frac{V_{ON}}{V_{OFF}} = \sqrt{\frac{N^2 + D - 1}{(N-2)^2 + D - 1}} \quad (1)$$

This is the ratio for obtaining the standard contrast.

On the other hand, in accordance with the invention, when the number of blocked scanning signals during an inhibiting interval is denoted by M and the RMS voltage value is set as zero during the inhibiting interval, the ratio of the RMS voltage values is given as follows:

$$\frac{V_{OND}}{V_{OFFD}} = \sqrt{\frac{N^2 + D - M - 1}{(N-2)^2 + D - M - 1}} \quad 2$$

Comparing equation (1) with equation (2), it can be determined that the ratio of RMS voltages derived from equation (2) in accordance with this invention is greater than that provided in the conventional method of equation (1). For example, when $N=10$, $D=131$ and $M=30$, the ratio of RMS voltage values obtained by equation (1) in the conventional method is 1.089, whereas the ratio of RMS voltage values obtained by equation (2) is 1.104. The display contrast is greatly improved as indicated by the increase in the ratio.

Figure 5:
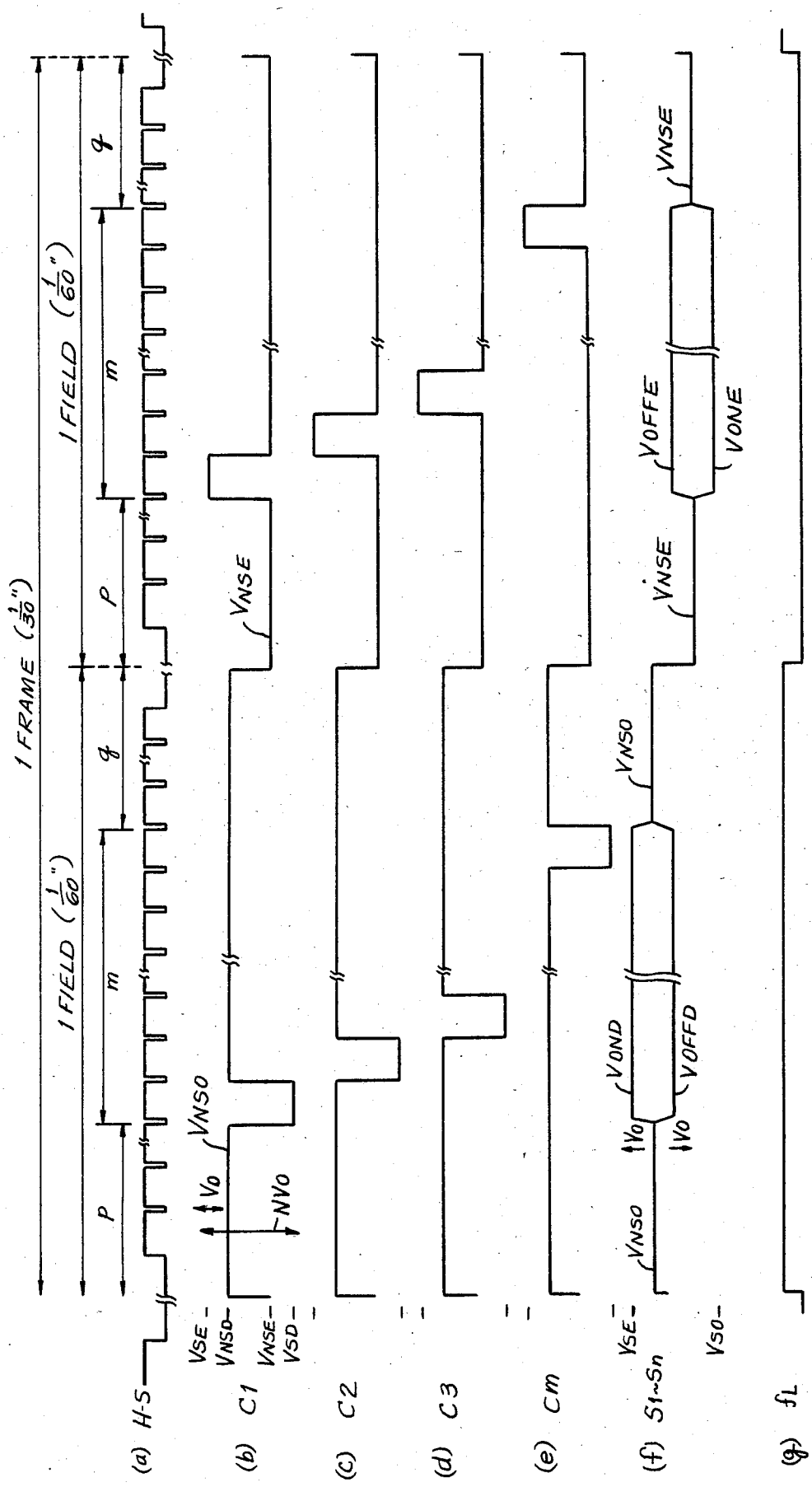
FIG. 5 is a timing chart of signals in accordance with this invention for driving the matrix display panel of FIG. 1.

With reference to FIG. 5, driving waveforms (b) to (e) are scanning signals C, synchronized by the horizontal synchronizing signals H-S in the curve (a). One image is formed in one frame comprising an odd numbered field. Each field requires 1/60 seconds. Among the scanning signals equivalent to 262.5 lines in one field, only m lines are included during the display interval. Lines in the period p and lines in the period q occur before and after the vertical blanking interval of the conventional signal. During the display interval, the horizontal scanning signals C1 to CM are applied to each row electrode from C1 to CM respectively in turn.

At that time, video signals S1 to Sn provide the video display data in an amplitude modulated format. The amplitude of the video signal becomes $2V_O$ in an AC amplitude selected multiplexing method of $V_O$-$NV_O$. The waveform of the video signal during the inhibiting intervals p, q, is characterized in that a fixed voltage level VNSO in the odd numbered field, or a fixed voltage level VNSE in the even numbered field, is brought to the same level as the unselected level of voltage. Thus, a voltage differential is not applied to a liquid crystal element during the inhibiting intervals p, q. Thereby, the rms voltage applied to the liquid crystal is reduced. The frame signal fL (curve g of FIG. 5) is a basic signal to provide an AC inverted drive for the liquid crystal on alternate fields. This enhances the life of the liquid crystal elements.

Figure 6:
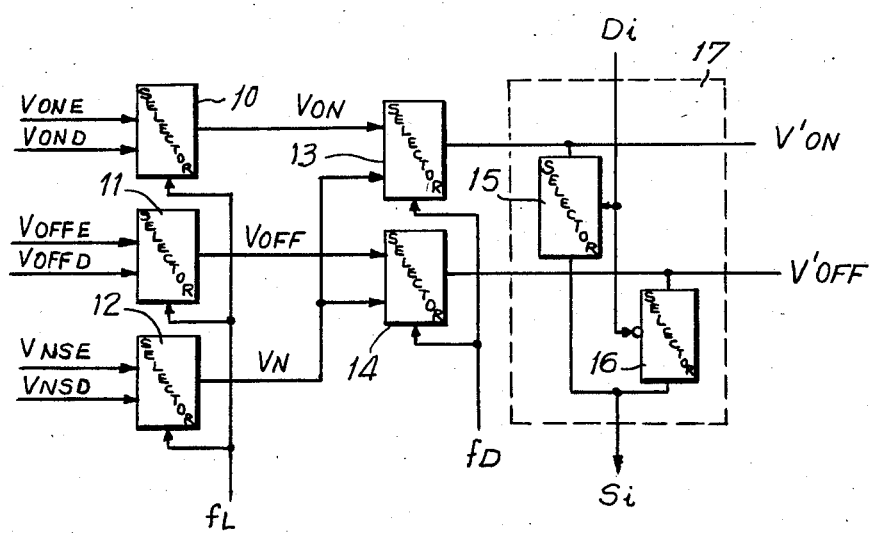
FIG. 6 is a block diagram of a circuit for producing the signals of FIG. 5 and FIG. 7.

FIG. 6 is a block diagram of a circuit for generating the video signals S1 to Sn associated with the waveforms of FIG. 5. These circuits include voltage selecting circuits 10–16. Voltage selecting circuits 10–12 select $V_{ONE}$ or $V_{ONO}$, $V_{OFFE}$ or $V_{OFFO}$, and $V_{NSE}$ or $V_{NSO}$, respectively, in synchronism with the frame signal fL. These circuits 10–12 output video signal voltage levels $V_{ON}$, $V_{OFF}$ and voltage level $V_N$ in the inhibiting interval to the voltage selecting circuits 13, 14, respectively, as indicated by the arrows in FIG. 6. The voltage selecting circuits 13, 14 output video signals $V'_{ON}$, $V'_{OFF}$ including $V_{ON}$, $V_{OFF}$ in the effective display interval m, and output $V_N$ in the inhibiting periods p, q, synchronized by an inhibiting interval signal fD. In this way, the video signal (f) of FIG. 5 is formed. The voltage selecting circuits 15, 16, deliver the video signal $V'_{ON}$, $V'_{OFF}$ to the data line Si, synchronized with a display timing signal Di. Here, a quantity n of blocks 17 comprising voltage selecting circuit 15, 16 are provided for supplying video signals S1 to Sn to n column electrodes.

As stated above, in the driving circuit for a matrix display panel in accordance with the invention, an interval wherein display is inhibited or blocked is provided adjacent to the vertical blanking interval of the video signal. During the inhibiting interval, the potential difference between video and scanning signals is held to zero and contrast of the display of the liquid crystal matrix is thereby improved.

In the embodiment described above, a generalized AC amplitude selective multiplexing method of the V-NV type has been described. It should be understood that other methods for driving the matrix may be used within the scope of the invention, for example, driving by separate upper and lower electrodes, a scanning method of a duplex matrix display or multimatrix liquid crystal panel, and the like.

A driving circuit which yields improved performance of an associated matrix display panel will now be described. The previous discussion of FIGS. 1-4 is equally applicable to this alternative embodiment noting, however, that the above description describes 131 scanning lines without discussion of the effect of this line reduction on the voltage ratio or of how this line reduction is achieved. In the below-described embodiment, the scanning line signals are omitted at a regular rate of one line for every r lines of scanning signals within the effective displaying interval. The value of r is selected in a range such that this additional omission of scanning lines does not affect display quality of the video image. Additionally, low voltage is applied to the liquid crystal panel during this line omission as well as during the prohibition during the vertical blanking interval described above. The driving method of the alternative embodiment in accordance with the invention further improves the contrast of display. In this embodiment, as an example, every other scanning line is omitted to provide a 1/131 duty. Also, video signals are supplied to the panel only between the 20th and 240th lines, that is, the effective displaying period as indicated in FIG. 4.

As described above, the video signals 1-19 and 241-262 are blocked or prohibited and video signals included in 220 lines of scanning signals are provided to the panel display. Accordingly, if the liquid crystal panel display provides one image with thinning, that is, using one scanning signal of every two available remaining scanning signals, 110 lines of scanning signals are provided to drive the liquid crystal matrix panel. Further, the RMS voltage value of the liquid crystal matrix panel during the vertical blanking interval (inhibiting interval) is made zero by keeping the potential of the scanning signal equal to that of the video signal. This technique results in an increase of the ratio of the RMS voltage values effectively applied to the liquid crystal and thereby the display contrast is improved.

Even when some of the scanning signals in the range of effective displaying images are properly abridged, the displayed images on the panel are without distortion and not inferior to the conventional images. For example, if one scanning signal is blocked for each r scanning signals in the effective scanning period, the number of scanning signals actually used becomes: r−1 divided by r, multiplied by (times) the usual amount. In FIG. 4, r is illustrated as 3 and in such a case only ⅔ of the conventional number of lines would be shown during the effective scanning period. Therefore, the driving duty is increased in correspondence with the reduction of the number of scanning signals. Moreover, the potential of the video signal is maintained at the same level as that of the scanning signal during the effective scanning period. Thus, the ratio of RMS voltages applied to the selected picture elements to that of the unselected picture elements can be increased. As a result, contrast of the display is further improved. Thus, using a driving circuit for a matrix display panel in accordance with the invention, high contrast images are obtained while maintaining apparent resolution of the images.

Generally, when a liquid crystal panel is driven by a generalized AC amplitude selective multiplexing method of the V-NV type, the ratio of rms voltage value applied to the selected picture elements as compared with the voltage value applied to the unselected picture elements, as an index for showing the level of contrast, is given by equation (1) above. As indicated above, D is the number of scanning signals in the panel and the driving duty is defined as 1/D. D is 262.5 in a conventional driving method for a liquid crystal panel. On the other hand, when M scanning signals are omitted during the inhibiting interval and one scanning signal is omitted for every r signals in the effective displaying period, the ratio or RMS voltage value applied to the selected picture elements to that of the unselected picture elements is expressed as follows:

$$\frac{V_{ON}}{V_{OFF}} = \sqrt{\frac{N^2 + (D - M - 1)(r - 1)/r}{(N - 2)^2 + (D - M - 1)(r - 1)/r}} \quad (3)$$

This equation represents a condition where the rms value is zero during the so-called inhibited period or blocking period. By comparison of the equations (1) and (3), it is shown that the ratio of RMS voltage values in accordance with this invention is greater than that of the conventional method of equation (1). For example, when N=10, D=262.5, M=60 and r=3, the ratio of RMS voltage value obtained by the equation (1) according to the prior art method is 1.111, while the ratio of rms voltage in accordance with this invention obtained by the equation (3) is 1.182. Thus, the contrast of the display is improved two times to three times as compared to the conventional construction.

Figure 7:
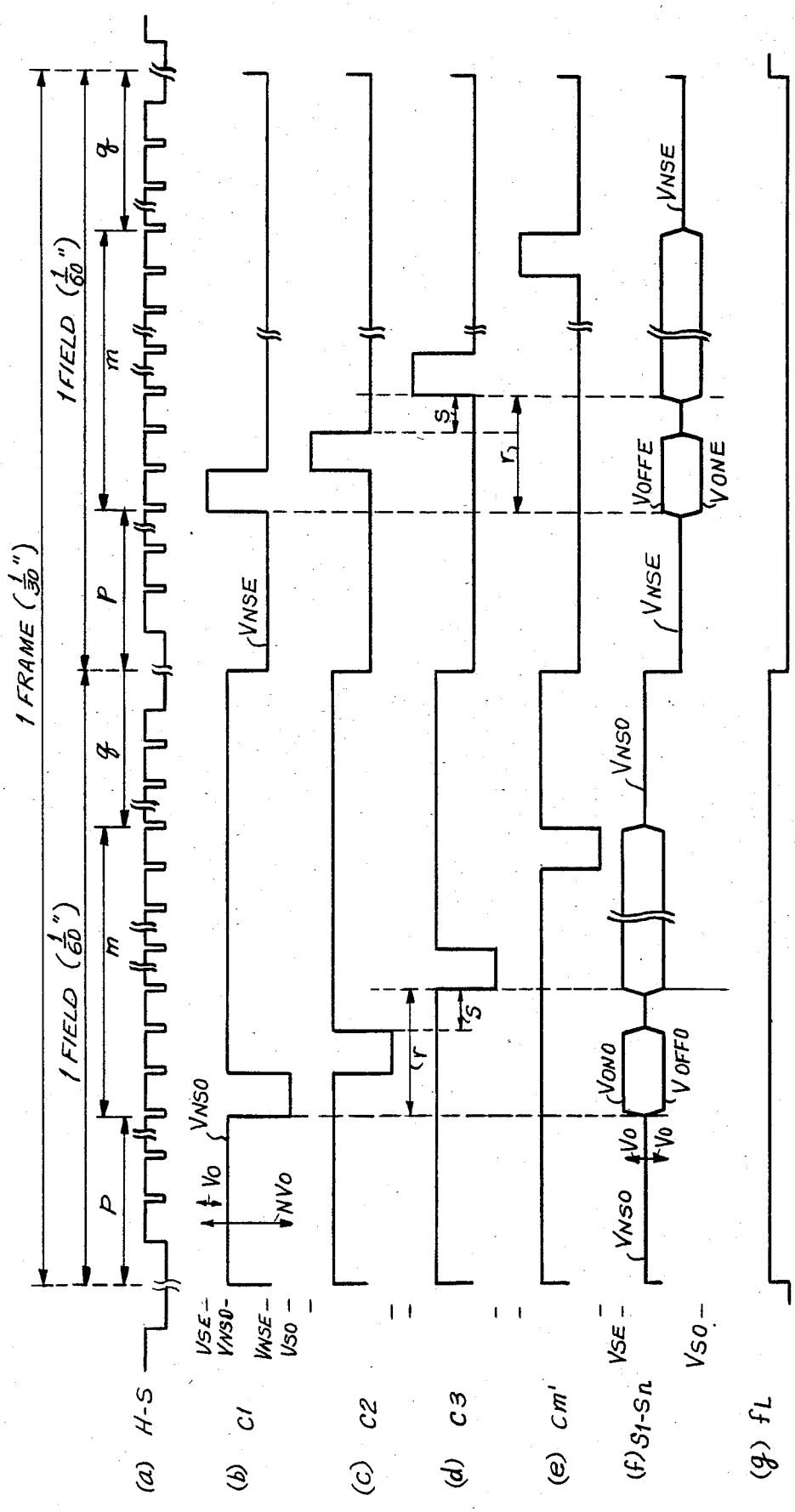
FIG. 7 is a timing chart similar to FIG. 5 for an alternative embodiment in accordance with the invention of a driving circuit for a matrix display panel.

FIG. 7 illustrates driving waveforms in accordance with this alternative embodiment of the invention. The driving waveform signals (b) to (g) are based on the horizontal synchronizing signal H-S (curve (a) of FIG. 7). As described above, the image is formed of one frame comprising an odd numbered field and an even numbered field. Each field is of 1/60 seconds duration. Among the scanning signals equivalent to 262.5 lines in one field, m lines are included during the display interval, p lines and q lines are included before and after the vertical blanking interval, respectively. Moreover, one out of every r scanning signals is abridged or blocked among m scanning signals for the purpose of blocking the selection of picture elements. Scanning signals C1 to Cm' are applied to the scanning lines in order.

$$m' = m(r-1)/r \tag{4}$$

Thus there is a period S for inhibiting selection of picture elements by one for every r scanning signals as shown in FIG. 7. At those times, video signals S1 to Sn are amplitude modulated video display signals. The amplitude of the video signal becomes $2V_O$ in the AC amplitude selective multiplexing method of $V_O\text{-}NV_O$. The waveform of this video signal during the inhibiting intervals p, q is characterized in that a fixed voltage level $V_{NSO}$ in the odd numbered field or a fixed voltage level $V_{NSE}$ in the even numbered field is brought to the same value as the unselected level. Thus, a differential voltage is not applied to the liquid crystal during the inhibiting intervals p, q and thereby the RMS voltage applied to the liquid crystal is reduced.

Simultaneously, the potential of the video signal is made equal to that of the scanning signal in one of every r scanning signals. In other words, the potential of the video signal during the inhibiting period S (FIG. 7) is $V_{NSO}$ in the odd numbered field and $V_{NSE}$ in the even numbered field. Again, frame signal fL is the fundamental signal for the AC inverting drive of the liquid crystal for alternate fields.

The circuits shown in the block diagram of FIG. 6 can also be used for generating video signals S1 to Sn associated with the waveforms of FIG. 7. These circuits consist of voltage selecting circuits 10-16. The voltage selecting circuits 10-12 select $V_{ONE}$ or $V_{ONO}$, or $V_{OFFE}$ or $V_{OFFO}$, and $V_{NSE}$ or $V_{NSO}$ respectively, synchronized with a frame signal fL, and output video signal voltage levels $V_{ON}$, $V_{OFF}$ and voltage level $V_N$ in the inhibiting interval to the voltage selecting circuits 13, 14, respectively, as indicated by the arrows of FIG. 6. The voltage selecting circuits 13, 14 generate video signals $V'_{ON}$, $V'_{OFF}$ including $V_{ON}$, $V_{OFF}$ in the effective display interval m', and $V_n$ in the inhibition periods p, q, synchronized with the inhibiting interval signal fD. In this way, video signals as shown in FIG. 7 (curve (f) are formed. The voltage selecting circuits 15, 16 output the video signals $V'_{ON}$, $V'_{OFF}$ to the data line Si synchronized with the display timing signal Di. Here, a quantity n of block 17, comprising the voltage selecting circuits 15, 16, are provided for supplying video signals S1 to Sn to n column (data) electrodes.

Figure 8:
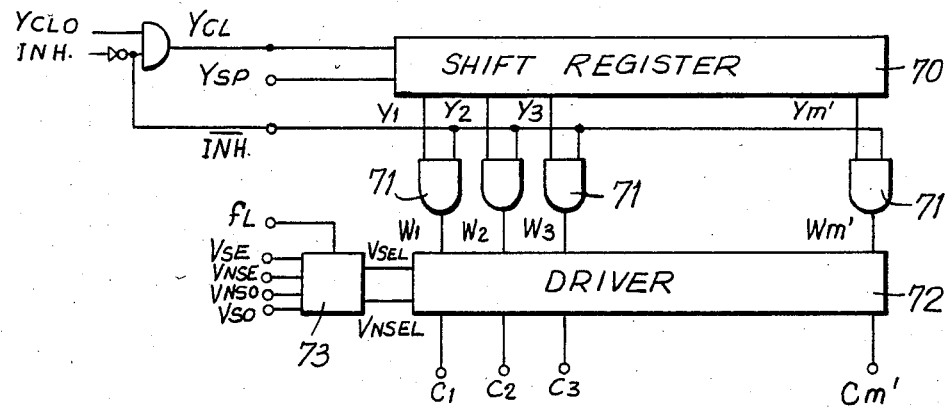
FIG. 8 is a scanning circuit for operation in accordance with FIG. 7.
Figure 9:
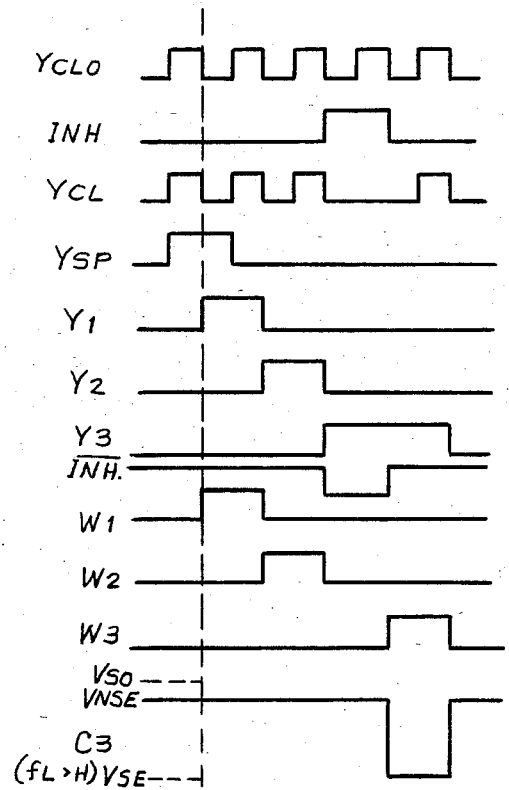
FIG. 9 is a timing chart of signals for the circuit of FIG. 8.

FIG. 8 is a circuit diagram of a generator for producing scanning signals C1 to Cm' when one scanning signal is abridged per r scanning signals among m scanning signals. FIG. 9 is a timing chart of output signals in each block.

Clock pulse YCL is produced by omitting one of the clock pulses YCLO over a certain selected time period in synchronization with an inhibiting signal INH. A shift register 70 begins to operate upon the entry of a clock pulse YCL and a start pulse YSP and outputs signals Y1, Y2, Y3, ... Ym' to gates 71. These signals Y1, Y2, Y3 ... Ym' are converted to signals W1, W2, W3 ... Wm' by the signal INH which occurs in the inhibiting period. The gates 71 supply the signals W1, W2, W3 ... Wm' to a driver 72. During the interval between the selecting periods of signals W2 and W3, a scanning signal cannot be applied to the driver 72. The driver 72 closes the selected level of the signal W1, W2, W3 ... Wm' to be at the potential of $V_{SE}$ (even field) or $V_{SO}$ (odd field) and the output of the driver 72 for an unselected element is at the level of $V_{NSE}$ (even) or $V_{NSO}$ (odd). Thus, for example, scanning signal C3 is produced and delivered to the scanning line but the time interval between C2 and C3 is greater than between C1 and C2. Also, the potential $V_{NSE}$, $V_{NSO}$ of the scanning signals are equal to the video scanning signal in the non-selecting condition so as not to apply an RMS voltage for each picture element during the periods when the data signals are abridged.

In summary, the driving circuit for a matrix display panel in accordance with the invention includes a plurality of data lines and scanning lines arranged in a matrix wherein composite video signals are applied to the data lines in synchronism with the scanning signals. Output of said composite video signals to the display panel is prohibited during the vertical blanking interval, and within the effective displaying period some video signals are also omitted in a regular timed sequence. During the vertical blanking period when the video data signals are omitted, the voltage level on the scanning line is made to be substantially equal to the level on the data line. These voltage levels are also applied during the intervals within the effective displaying period when lines of data are omitted.

In both embodiments described herein, a generalized amplitude selective multiplexing method of V-NV has been described. It should be understood that the driving circuit for a matrix display panel in accordance with this invention is applicable to other driving methods of liquid crystal panels, such as driving independently separate upper and lower electrodes, a scanning method of duplex scanning signals or a quad-scanning signals technique for a duplex matrix display or multi-matrix liquid crystal panel, and the like.

It will thus be seen that the objects set forth above, among those made apparent from the preceding description, are efficiently attained and, since certain changes may be made in the above instructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving circuit for applying a video input signal comprising a plurality of sequential video scanning lines to a matrix display panel having a plurality of data electrodes and a plurality of scanning electrodes arranged in a matrix, a portion of the scanning lines containing significant data signals and another portion containing data signals of little or no significance, the driving circuit comprising:

circuit means for driving said scanning electrodes in sequence and in synchronism with at least a portion of the scanning lines which contain significant data signals while omitting said portion containing data signals of little or no significance;

circuit means for driving said data electrodes with video data from said input signal for display in synchronism with said scanning electrodes; and circuit means responsive to said input signal for applying substantially equal potentials to said scanning electrodes and to said data electrodes when said scanning lines are omitted, whereby the contrast of the display produced by the display panel is enhanced.

2. The driving circuit of claim 1 wherein the input signal also comprises a synchronizing signal and said circuit means for driving said scanning electrodes in sequence responds to said synchronizing signal to provide a vertical blanking interval when data signals of little or no significance are being received and in which said substantially equal potentials are applied to said scanning and said data electrodes during said vertical blanking interval.

3. The driving circuit of claim 2 wherein the portion of the scanning lines containing significant data signals comprises an effective display period and wherein the circuit means for driving said scanning electrodes further comprises:

circuit means for omitting at least one scanning line in the effective display period, whereby the number of scanning lines required for production of an image from a standard television signal is reduced.

4. A driving circuit for a matrix display panel as claimed in claim 1 wherein the potential difference applied between said scanning electrodes and said data electrodes when said scanning lines are omitted is zero.

5. A driving circuit for a matrix display panel as claimed in claim 3 wherein the potential difference applied between said scanning electrodes and said data electrodes when said scanning lines are omitted is zero.

6. The driving circuit of claim 3 wherein the circuit means for omitting at least one scanning line omits scanning lines in the effective display period at regular intervals, one scanning line of data being omitted for every r scanning lines in said video signal input for display on said panel, where r is less than the number of scanning lines in said video signal during said effective display period.

7. A driving circuit for a matrix display panel as claimed in claim 6, wherein at least a portion of the input signal comprises 262.5 scanning lines per frame in which the effective display period includes approximately 220 scanning lines, the difference totalling approximately 40 scanning lines of said input data signal being omitted on at least one side of said vertical blanking interval, wherein r is equal to 2, whereby approximately 110 scanning lines in the effective display period are displayed.

8. The driving circuit of claim 2 and wherein said circuit means for driving said scanning electrodes in sequence omits scanning lines occurring in at least one of a period of immediately before and immediately after said vertical blanking interval.

* * * * *